United States Patent
Yamamoto et al.

(10) Patent No.: US 6,676,911 B1
(45) Date of Patent: Jan. 13, 2004

(54) EXHAUST GAS TREATING AGENT, PROCESS FOR PRODUCING THE SAME, AND METHOD OF TREATING EXHAUST GAS

(75) Inventors: Takanori Yamamoto, Osaka (JP); Hiroaki Suzuki, Osaka (JP); Kensuke Kanai, Osaka (JP); Shingo Jami, Osaka (JP); Kouiti Yukutake, Osaka (JP); Shigehiro Kobayashi, Osaka (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 09/744,415

(22) PCT Filed: Jul. 8, 1999

(86) PCT No.: PCT/JP99/03693
§ 371 (c)(1),
(2), (4) Date: Jan. 23, 2001

(87) PCT Pub. No.: WO00/04982
PCT Pub. Date: Feb. 3, 2000

(30) Foreign Application Priority Data

Jul. 23, 1998 (JP) .......................................... 10-207778

(51) Int. Cl.$^7$ .............................. B01J 8/00; B01J 20/10; B01J 20/04; C01B 17/00; C01B 17/45
(52) U.S. Cl. .............. 423/210; 423/240 R; 423/243.01; 502/407; 502/411
(58) Field of Search ................................ 502/407, 411; 423/210, 240 R, 243.01

(56) References Cited

U.S. PATENT DOCUMENTS

| 5,403,808 A | 4/1995 | Kenney et al. ............. 502/411 |
| 5,538,537 A | 7/1996 | Schmidt et al. ................ 95/107 |

FOREIGN PATENT DOCUMENTS

| DE | 3717848 a | | 12/1988 | |
| EP | 0 801 971 A1 | | 10/1997 | |
| FR | 2 615 755 A1 | | 12/1988 | |
| JP | 52049233 | * | 4/1977 | .......... B28B/11/00 |
| JP | 09248447 | * | 9/1997 | ............ B01J/20/02 |
| WO | WO 89/07974 | | 9/1989 | |
| WO | WO97/12662 | * | 4/1997 | .......... B01D/53/82 |

* cited by examiner

Primary Examiner—Stanley S. Silverman
Assistant Examiner—Jonas N. Strickland
(74) Attorney, Agent, or Firm—Knobbe, Martens, Olson & Bear, LLP

(57) ABSTRACT

The invention provides an exhaust gas treatment agent characterized in that it comprises calcium silicate hydrate particles having a mean particle diameter of 0.2 to 4 $\mu$m and a specific surface area of not less than 60 m$^2$/g and calcium hydroxide particles having a mean particle diameter of not more than 4 $\mu$m and the content of calcium hydroxide particles in both particle components is within the range of 20 to 60% by weight; a method of producing the exhaust gas treatment agent; and a process for the treatment of exhaust gases and soot and dust which uses the exhaust gas treatment agent.

7 Claims, 2 Drawing Sheets

EXHAUST GAS TREATING AGENT, PROCESS FOR PRODUCING THE SAME, AND METHOD OF TREATING EXHAUST GAS

TECHNICAL FIELD

This invention relates to a technology of treating acid gases, such as hydrogen chloride gas (hereinafter referred to as "HCl" for short) and sulfur oxides (hereinafter referred to as "$SO_x$" for short), which are contained in exhaust gases in exhaust gas treatment equipment in a waste incineration system, for instance, and to a technology of stably fixing hazardous or toxic heavy metals occurring in soot and dust formed upon exhaust gas treatment and trapped in dust collectors.

PRIOR ART

Ordinary incineration equipment generally comprises an incinerator, a heat exchanger or water sprayer for cooling high temperature exhaust gases, an apparatus for blowing slaked lime (calcium hydroxide) into exhaust gases (in an exhaust gas guide pipe) for neutralizing acid gases such as HCl, and a dust collector and, optionally, further comprises an apparatus or equipment for eliminating hazardous components such as $SO_x$, nitrogen oxides (hereinafter referred to as "$NO_x$" for short) and dioxins. Soot and dust generated upon incineration of wastes contains dust, reaction products formed from slaked lime and acid gases such as HCl, unreacted slaked lime residue and, further, low-boiling compounds containing a toxic heavy metal such as Pb, and cyanides. Therefore, simultaneous soot and dust treatment is also necessary.

Today, in the disposal of industrial wastes containing hazardous heavy metals and cyanides, soot and dust is admixed with cement, water is added, and the mixture is kneaded, cured and solidified to thereby stabilize and prevent toxic heavy metals and cyanides from leaching out. However, the conventional method of industrial waste treatment which comprises mere solidification using cement such as mentioned above has various problems and, without strict management of treatment products, may cause a secondary environmental pollution.

The soot and dust collected in municipal refuse incinerators, for instance, contains hazardous heavy metals such as lead (Pb), cadmium (Cd), mercury (Hg), chromium (Cr) and copper (Cu). Currently, such kind of soot and dust is blended with bottom ash for landfill or solidified by means of cement. However, even solidification with cement involves the risk of leaching of Pb and the like. In recent equipment, in particular, slaked lime or quick lime (calcium oxide) is blown into exhaust gases in the exhaust route to catching acid gases generated upon incineration, for example HCl and $SO_x$. The unreacted portion of such slaked lime or quick lime remains in fly ash and, therefore, the soot and dust collected has a high alkalinity not lower than pH 12. It is well known that Pb readily leaches out under highly alkaline conditions. Thus, highly alkaline soot and dust or a treatment product derived therefrom, without proper treatment, causes a serious problem, namely leaching of Pb.

Since the disposal by landfill of untreated soot and dust is prohibited by law, a chelating agent is added to soot and dust to thereby prevent Pb from leaching out. However, chelating agents are expensive. And, for some kinds of soot and dust, in particular highly alkaline soot and dust with a high concentration of Pb, they cannot suppress the leaching of Pb to a level below the legal limit (not more than 0.3 ppm) in some instances without adding them in large amounts (not less than 5% of the weight of soot and dust), hence imposing no light burden from the operation cost viewpoint.

Accordingly, the establishment of a novel exhaust gas treatment agent and a novel method of exhaust gas treatment with and by which acid gases such as HCl and $SO_x$ generated upon incineration of municipal and other wastes can be efficiently trapped and hazardous heavy metals can simultaneously be fixed has earnestly been desired.

In response to such a social demand, Japanese Unexamined Patent Publication H09-108538, for instance, discloses a treatment agent for reducing the content of alkaline compounds in soot and dust collected in dust collectors and preventing leaching of toxic metals such as Pb by using highly reactive calcium silicate hydrate in exhaust gas treatment systems.

Japanese Examined Patent Publication H07-63581 discloses an exhaust gas treatment agent which is prepared by dispersing a raw material composed of a substance capable of providing calcium oxide, silicon dioxide and aluminum oxide and a substance capable of providing calcium sulfate in water.

However, treatment of exhaust gases by contacting with calcium silicate hydrate can indeed reduce the alkaline substance levels in soot and dust but cannot be said to be better in acid gas collection efficiency as compared with slaked lime. Thus, when exhaust gases with a high acid gas concentration are treated, the neutralization agent is required in increased amounts and, as a result, the amount of soot and dust increases.

OBJECTS OF THE INVENTION

Accordingly, it is a main object of the present invention to provide a novel technology of treating exhaust gases as well as soot and dust by which acid gases, such as HCl and $SO_x$, contained in exhaust gases generated upon incineration can efficiently be trapped and, at the same time, hazardous heavy metals can be stably fixed in the treatment of exhaust gases generated in incinerators for industrial wastes, municipal wastes and the like and in the treatment of soot and dust collected on that occasion.

DETAILED DESCRIPTION OF THE INVENTION

Paying attention to the state of the art as mentioned above, the present inventors continued studies and, as a result, found that a material comprising, as main constituents, calcium silicate hydrate particles having a controlled mean particle diameter and a controlled specific surface area can efficiently catch acid gases in exhaust gases and further can stably fix heavy metals in soot and dust without increasing the amount of soot and dust.

Thus, the present invention provides an exhaust gas treatment agent as specified below and a method of producing the same as well as a process for the treatment of exhaust gases and soot and dust as specified below.

1. An exhaust gas treatment agent characterized in that it comprises calcium silicate hydrate particles having an average particle diameter of 0.2 to 4 μm and a specific surface area of not less than 60 $m^2/g$ and calcium hydroxide particles having an average particle diameter of not more than 4 μm and the content of calcium hydroxide particles in both particle components is within the range of 20 to 60% by weight.

2. An exhaust gas treatment agent as defined in claim 1 occurring as a slurry.
3. An exhaust gas treatment agent as defined in claim 1 occurring as a dry powder.
4. A method of producing slurry-form calcium silicate- and calcium hydroxide-based exhaust gas treatment agents which comprises adding 100 to 2,000 parts by weight of water to a total of 100 parts by weight of a calcium silicate-containing raw material and a calcium hydroxide-generating raw material and carrying out the hydration reactions at 40 to 100° C. under wet grinding conditions.
5. A method of producing powder-form calcium silicate- and calcium hydroxide-based exhaust gas treatment agents which comprises adding 100 to 2,000 parts by weight of water to a total of 100 parts by weight of a calcium silicate-containing raw material and a calcium hydroxide-generating raw material and carrying out the hydration reactions at 40 to 100° C. under wet grinding conditions and then drying and classifying the reaction product.
6. A process for exhaust gas treatment which comprises contacting an exhaust gas with the exhaust gas treatment agent defined in claim 1.
7. A process for the treatment of exhaust gases and soot and dust which comprises contacting an exhaust gas with the exhaust gas treatment agent defined in claim 1 and adding water to the soot and dust collected from the exhaust gas in a dust collector and kneading and solidifying the resulting mixture.

The exhaust gas treatment capacity of those exhaust gas neutralizing agents which are most frequently used and comprise slaked lime (calcium hydroxide) in powder form may be increased by increasing the exhaust gas-contacting surface area. As a primary measure of increasing the contacting area, there may be mentioned the grinding of a slaked silica powder to a finer powder to thereby increase the specific surface area thereof.

For example, Japanese Unexamined Patent Publications H09-103640 and H09-110425 disclose a method of producing calcium hydroxide by subjecting to reaction a mixture of wet-ground calcium oxide, water and an alcohol in a digester and maturing the resulting digestion reaction mixture in the aging apparatus and removing the water and alcohol by evaporation. However, there is a limit to the method of increasing the exhaust gas-contacting area by grinding slaked lime, which is a crystalline substance, to a fine powder.

When a calcium silicate hydrate powder is used as an exhaust gas-neutralizing agent, the reactivity with acid gases is improved because of its large specific surface area but, since the alkali substance content is low as compared with slaked lime, it cannot be said that the reactivity thereof is markedly improved as compared with neutralizing agents comprising a fine slaked lime powder.

In particular, in the treatment of exhaust gas, which is the target of the present invention, the time of contacting with exhaust gases is as short as several seconds to scores of seconds, so that when the high specific surface area characteristic of calcium silicate hydrate particles cannot be fully utilized. Namely, the voids in calcium silicate hydrate particles are very small and, therefore, when the reaction time is short, acid gases cannot diffuse into the particles but the reactions occur only on the apparent particle surface.

On the contrary, the exhaust gas treatment agent according to the invention contains high specific surface area calcium silicate hydrate particles having a mean particle diameter of 0.2 to 4 $\mu$m and a specific surface area of not less than 60 m$^2$/g and, therefore, the reactions can proceed in the inside as well in a short period of time and the reactivity can thus be markedly increased. Further, the exhaust gas treatment agent of the invention contains, together with such fine calcium silicate hydrate particles, a specified amount of fine calcium hydroxide particles (mean particle diameter not more than 4 $\mu$m; 20 to 60% by weight of the total weight of both components) and, therefore, the alkali amount is large and the acid gas treatment capacity per unit weight is increased. When the particle diameter of calcium hydroxide particles is large, the acid gas neutralizing capacity decreases and there remain unreacted particles, hence the risk of heavy metals being not inhibited from leaching out increases. According to the present invention, as is apparent from the discussion, fine calcium silicate hydrate particles and fine calcium hydroxide particles are simultaneously precipitated, so that fine slaked lime particles are formed which are highly dispersed or adhering to fine particle calcium silicate hydrate.

The calcium silicate hydrate particles in the exhaust gas treatment agent according to the invention have a mean particle diameter of about 0.2 to 4 $\mu$m (more preferably about 0.2 to 3 $\mu$m) and a specific surface area of not less than 60 m$^2$/g (more preferably not less than 70 m$^2$/g). When the mean particle diameter is too large or the specific surface area is too small, a sufficient HCl trapping ability will not be shown. When the mean particle diameter is too small, no problem arises from the performance viewpoint but the production cost increases and handling becomes difficult, which are drawbacks from the practical viewpoint.

Referring to the present invention, the "mean particle diameter" of calcium silicate hydrate particles and of calcium hydroxide particles means the "mean particle diameter" of particles in the slurry immediately after completion of the hydration reaction which is carried out in the manner of wet grinding, as mentioned later herein. The term also means the "mean particle diameter of particles after particle diameter adjustment" as obtained after slurry drying and after disintegration treatment (breaking up into finer particles) and classification of secondary particles since, in powder particle formation, secondary particles are formed as a result of aggregation of primary particles.

It is presumable that the specific surface area of calcium silicate hydrate particles has almost the same value as that of slurry particles and of particle diameter-adjusted particles, if the mean particle diameter remains the same.

The calcium hydroxide particles in the exhaust gas treatment agent of the present invention preferably have a mean particle diameter of not greater than 4 $\mu$m. When the mean particle diameter is too large, the acid gas neutralizing ability will be low, hence the leaching of such heavy metals as Pb from the solidified soot and dust cannot be inhibited to a satisfactory extent.

In the exhaust gas treatment agent of the invention, the content of calcium hydroxide fine particles is generally about 20 to 60 parts by weight (more preferably about 20 to 50 parts by weight) per 100 parts by weight of the sum total of calcium silicate hydrate fine particles and calcium hydroxide fine particles. The content of calcium hydroxide fine particles is selected in the above range according to the concentration of acid gases in the exhaust gas to be treated and the heavy metal concentration in the soot and dust discharged. Thus, when the acid gas concentration in the exhaust gas is high, the content of calcium hydroxide fine particles is increased and, when the heavy metal concentration in soot and dust is high, the content of calcium silicate hydrate fine particles is increased.

The method of producing the exhaust gas treatment agent according to the present invention is characterized by adding about 100 to 2,000 parts by weight (more preferably about 100 to 1,000 parts by weight) of water to 100 parts by weight of the raw material comprising a calcium silicate raw material and a calcium hydroxide raw material, charging the mixture into a grinder and effecting wet grinding and the hydration reactions simultaneously.

The mixing ratio between the calcium silicate raw material and calcium hydroxide raw material may be selected according to the desired calcium silicate hydrate fine particles/calcium hydroxide fine particles ratio in the exhaust gas treatment agent.

As examples of the calcium silicate raw material, there may be mentioned various cement species, water-granulated blast furnace slag, slag cement and the like. These materials generally contain calcium compounds such as calcium sulfate and calcium aluminate as byproduct components and these compounds are also involved in the hydration reactions but produce no problems. In cases where the amount of calcium hydroxide particles fine in the exhaust gas treatment agent may be relatively small, these cement species themselves can serve as sources of calcium silicate and of calcium hydroxide. The "calcium silicate-containing raw material and calcium hydroxide-forming raw material" as so referred to in the present specification includes the case in which cement alone is used as the raw material.

As the calcium hydroxide source material, there may be mentioned, for example, calcium oxide, calcium hydroxide and dolomite plaster. Dolomite plaster generally contains magnesium compounds such as magnesium hydroxide and magnesium carbonate in addition to calcium compounds but the magnesium compounds offer no particular problem.

The wet grinding and hydration reactions of the raw materials may be conducted generally at a temperature of about 40 to 100° C. (more preferably about 50 to 80° C.) until particles satisfying the given requirements (mean particle diameter, specific surface area, etc.) are formed.

In producing the exhaust gas treatment agent, according to the charge ratio of water to the raw materials, slurries are obtained in forms differing in the concentration of product solids (fine calcium silicate hydrate particles+fine calcium hydroxide particles) and in flowability. Each slurry obtained may be used, in that form, as an exhaust gas treatment agent.

Alternatively, the slurry obtained may be dried at about 80° C. or a higher temperature (more preferably about 100 to 200° C.) and, if necessary after disintegration treatment, classified to a desired particle diameter, whereby an exhaust gas treatment agent in powder form can be obtained.

In the treatment of exhaust gases and soot and dust according to the invention, in a treatment apparatus belonging to the waste incineration equipment, the exhaust gas treatment agent of the invention is blown into an exhaust gas in a treatment apparatus belonging to the waste incineration equipment and then soot and dust is collected from the exhaust gas using a dust collector. Then, water is added, if necessary together with a hazardous metal stabilizing or fixing agent, to the soot and dust and the mixture is mixed up by agitating and allowed to solidify.

When the exhaust gas treatment agent is used in slurry form, too, water in the slurry evaporates upon contacting with the exhaust gas, so that the same form of soot and dust is formed as formed when the exhaust gas treatment agent is used in powder form.

The hazardous metal stabilizing or fixing agent to be used when necessary may be any known material. More specifically, there may be mentioned, for example, one or more species selected from among neutralizing agents (aluminum hydroxide, phosphoric acid, aluminum sulfate, etc.), inorganic adsorbents (silica gel, alumina gel, etc.), chelating agents (dimethyldithiocarbamic acid salts, etc.), water glass, phosphoric acid salts, and compounds (sulfides, phosphoric acid salts) capable of reacting with hazardous metals such as Pb to form hardly soluble or insoluble compounds, among others.

The exhaust gas treatment agent according to the invention produces the following peculiar effects resulting from the method of production thereof.

The use of cement, which is obtainable in large amounts and is inexpensive, as the calcium silicate source material is taken as a typical example. The hydration reaction of cement starts when cement particles come into contact with water. Thereafter, a hydration product film or layer is gradually formed on the cement particle surface. The hydration reaction of cement progresses faster when the rate of water passing through gaps in the hydrate layer formed on the cement particle surface is greater and when the rate of diffusion of ions such as calcium ions leached out from cement particles through the hydrate layer is higher. Thus, the thickness of the hydrate layer formed on the cement particle surface is the rate determining factor of the hydration reaction. Therefore, even when cement and water are kneaded together to form a cured product or caking is prevented by agitating the cement slurry or by bubbling or the reaction temperature is raised to promote the reaction, it is impossible to markedly increase the rate of hydration of cement. For attaining complete hydration of cement, a very long time is required.

Calcium silicate in cement and the calcium hydroxide source material added cause, by hydration, calcium silicate hydrate and calcium hydroxide crystals, respectively, to precipitate out. By carrying out a grinding operation on that occasion simultaneously with the hydration reaction, the crystal growth of hydration reaction products is suppressed by the impact and friction between grinding media (milling balls etc.) and the materials to be ground (hydration reaction products) and, as a result, very fine calcium silicate hydrate particles and calcium hydroxide hydrate particles are formed.

Such fine hydrate particles are formed only by the method of the present invention which comprises wet grinding a raw material or materials, such as cement, which allow dissolution of the calcium ion upon contacting with water, and simultaneously effecting hydration. Thus, the fine hydrate particles formed by the method of the invention are very fine and have a higher specific surface area as compared with ordinary powder form hydrate particles (generally not less than 5 $\mu$m) obtained by merely grinding calcium silicate and calcium hydroxide in bulk or by reacting raw materials with water.

Thus, according to the present invention, a grinding operation is conducted simultaneously with the progress of the hydration reactions of raw materials, so that the hydrate layer formed on the cement particle surface and serving as a rate-determining factor of the hydration reactions is removed and the growth of hydrate crystals can be suppressed. As a result, a calcium silicate hydrate fine powder and calcium hydroxide fine particles are formed.

EFFECTS OF THE INVENTION

According to the invention, the followed remarkable effects are attained.

(a) Since common materials are used and the hydration reactions of raw materials and a grinding operation are carried out simultaneously, the time for the production of exhaust gas treatment agents can be curtailed and the cost of production thereof can be reduced.

(b) The particles of calcium silicate hydrate and calcium hydroxide hydrate obtained under grinding are small and have a large specific surface area and therefore are superior in reactivity with acid gases. In particular, while calcium hydroxide hydrate tends to form large crystals, the calcium hydroxide in the exhaust gas treatment agent according to the invention is very fine since crystals hardly grow.

(c) The exhaust gas treatment agent according to the invention contains highly alkaline substances and is high in reactivity, as mentioned above, and thus allows the reactions with acid gases such as HCl to proceed efficiently. Therefore, after completion of the reactions, it is low in alkalinity and the leaching out of Pb and the like from the solidified soot and dust is markedly suppressed.

(d) The calcium silicate hydrate particles before and after reaction have a large specific surface area and therefore are high in hazardous heavy metal trapping effect and inhibit the leaching of hazardous heavy metals.

(e) The cement-solidified soot and dust has a high strength and therefore the final solidified waste volume can be much reduced.

(f) When portland cement or clinker thereof is used as a calcium silicate material, the exhaust gas treatment agent can be produced at low cost, with stable quality and in large amounts.

(g) As a result of the foregoing, when the exhaust gas treatment agent of the invention is used in the treatment of exhaust gases from various waste incinerators, it is possible to efficiently trap acid gases and stably fix hazardous heavy metals while reducing the resulting amount of soot and dust.

EXAMPLES

Figure 1:
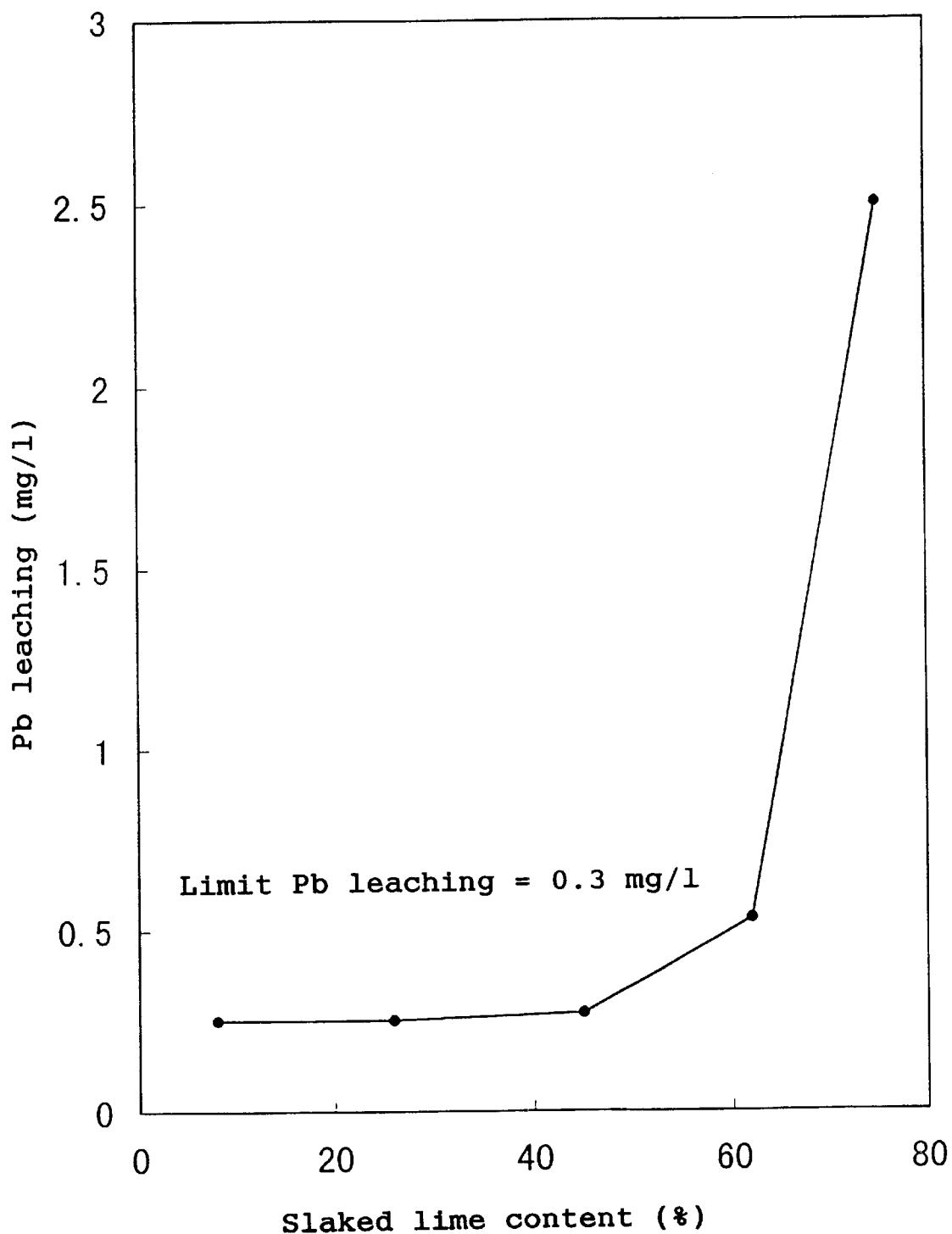
FIG. 1 is a graphic representation of the relation between the content of calcium hydroxide particles and the amount of HCl trapped for the exhaust gas treatment agents prepared in the examples and comparative examples.

The following examples and comparative examples illustrate the characteristic features of the invention more clearly.

Example 1

Normal portland cement and warm water (70° C.) were charged, in a solid/liquid ratio of 1:6, into a grinder (vibrating mill; hereinafter "grinder" means "vibrating mill") and the hydration reactions were allowed to proceed for 2 hours with grinding and the slurry obtained was dried at 150° C. for 24 hours and broken up into finer particles to give an exhaust gas treatment agent-1 of the present invention.

The mean particle diameter, specific surface area and calcium hydroxide content of each of the gas treatment agent obtained in Example 1 and the gas treatment agents obtained in the succeeding examples and comparative examples are shown in Table 1.

Example 2

A 7:3 (by weight) mixture of normal portland cement and calcium oxide, and warm water (70° C.) were charged, in a solid/liquid ratio of 1:6, into a grinder and hydration was effected for 2 hours with grinding and the slurry obtained was dried at 150° C. for 24 hours and then broken up into finer particles to give an exhaust gas treatment agent-2 of the present invention.

Comparative Example 1

Normal portland cement and warm water (70° C.) were kneaded, in a solid/liquid ratio of 1:6, in a high speed agitating mixer and, after 3 days of curing at 70° C., the solid product was ground and dried to give cement hydrate particles. This product was used as gas treatment agent in the test examples mentioned later.

Comparative Example 2

Normal portland cement and warm water (70° C.) were charged, in a solid/liquid ratio of 1:6, into a reaction vessel and the mixture was agitated for 24 hours while maintaining at 70° C. The slurry obtained was dried at 150° C. for 24 hours and broken up into finer particles to give a cement hydration product. This was used as a gas treatment agent in the test examples mentioned later.

Comparative Example 3

A calcium silicate hydrate powder was prepared by grinding, in a grinder, calcium silicate hydrate hydrothermally synthesized under high temperature and high pressure conditions. This was used as a gas treatment agent in the test examples mentioned later.

Comparative Example 4

Normal portland cement and warm water (30° C.) were charged, in a solid/liquid ratio of 1:6, into a grinder and the hydration reactions were allowed to proceed for 2 hours with grinding and the slurry obtained was dried at 150° C. for 24 hours and broken up into finer particles to give a cement hydration product, This was used as a gas treatment agent in the test examples mentioned later.

Comparative Example 5

Normal portland cement and warm water (70° C.) were charged, in a solid/liquid ratio of 1:6, into a grinder and the hydration reactions were allowed to proceed for 40 minutes with grinding and the slurry obtained was dried at 150° C. for 24 hours and broken up into finer particles to give a cement hydration product, This was used as a gas treatment agent in the test examples mentioned later.

Comparative Example 6

A 3:7 (by weight) mixture of normal portland cement and calcium oxide, and warm water (70° C.) were charged, in a solid/liquid ratio of 1:6, into a grinder and hydration was effected for 2 hours with grinding and the slurry obtained was dried at 150° C. for 24 hours and then broken up into finer particles to give a hydration product. This was used as a gas treatment agent in the test examples mentioned later.

Comparative Example 7

A 4:6 (by weight) mixture of normal portland cement and calcium oxide, and warm water (70° C.) were charged, in a solid/liquid ratio of 1:6, into a grinder and hydration was effected for 2 hours with grinding and the slurry obtained was dried at 150° C. for 24 hours and then broken up into finer particles to give a hydration product. This was used as a gas treatment agent in the test examples mentioned later.

Comparative Example 8

Fly ash and warm water (70° C.) were charged, in a solid/liquid ratio of 1:6, into a grinder and hydration was effected for 2 hours with grinding and the slurry obtained was dried at 150° C. for 24 hours and then broken up into finer particles to give a hydration product. This was used as a gas treatment agent in the test examples mentioned later.

Comparative Example 9

Special grade slaked lime was used as a gas treatment agent in the test examples mentioned later.

TABLE 1

|  | Mean particle diameter ($\mu$m) | Specific surface area (m$^2$/g) | Calcium hydroxide content (%) |
| --- | --- | --- | --- |
| Example 1 | 2 | 130 | 26 |
| Example 2 | 2 | 110 | 45 |
| Compar. Ex. 1 | 10 | 25 | 45 |
| Compar. Ex. 2 | 15 | 20 | 20 |
| Compar. Ex. 3 | 7 | 40 | 20 |
| Compar. Ex. 4 | 2 | 50 | 26 |
| Compar. Ex. 5 | 5 | 70 | 23 |
| Compar. Ex. 6 | 2 | 66 | 75 |
| Compar. Ex. 7 | 2 | 72 | 62 |
| Compar. Ex. 8 | 2 | 65 | 8 |
| Compar. Ex. 9 | 6 | 15 | 96 |

From the results shown in Table 1, it is evident that the exhaust gas treatment agent-1 and exhaust gas treatment agent-2 according to the invention have a smaller mean particle diameter and a markedly large specific surface area.

Test Example 1

An HCl-containing gas was treated using 100 mg each of the exhaust gas treatment agent-1 and exhaust gas treatment agent-2 according to the invention and the exhaust gas treatment agents according to Comparative Examples 1 to 9.

Thus, 100 mg of each exhaust gas treatment agent was blown into a simulated flue which was maintained at 300° C. by means of an electric furnace and through which a 0.1% HCl-containing gas was being passed through at a flow rate of 10 liters per minute and, after 10 seconds, the residual HCl concentration was determined and the amount of HCl gas trapped was thus determined. Further, the powder recovered after the determination was dispersed in water and the pH of the dispersion was measured. The results are shown in Table 2.

TABLE 2

|  | Amount of HCl trapped (10$^{-5}$ mol/g) | PH after 10 seconds of reaction |
| --- | --- | --- |
| Example 1 | 11.0 | 10.3 |
| Example 2 | 11.6 | 10.5 |
| Compar. Ex. 1 | 2.2 | 11.5 |
| Compar. Ex. 2 | 3.5 | 12.0 |
| Compar. Ex. 3 | 3.0 | 10.0 |
| Compar. Ex. 4 | 3.5 | 10.7 |
| Compar. Ex. 5 | 5.5 | 11.5 |
| Compar. Ex. 6 | 11.0 | 12.0 |
| Compar. Ex. 7 | 11.5 | 10.7 |
| Compar. Ex. 8 | 3.0 | 10.0 |
| Compar. Ex. 9 | 10.0 | 12.0 |

The exhaust gas treatment agent-1 and exhaust gas treatment agent-2 according to the invention are high in HCl trapping capacity and, after 10 seconds of reaction, the aqueous dispersions thereof show low pH values.

On the contrary, the exhaust gas treatment agents according to Comparative Examples 1 to 3 are large in mean particle diameter and small in specific surface area, hence is low in HCl trapping capacity.

The exhaust gas treatment agent according to Comparative Example 4 has a small mean particle diameter but has a small specific surface area, hence is low in HCl trapping capacity, too.

The exhaust gas treatment agent according to Comparative Example 5 conversely has a large specific surface area but is large in mean particle diameter, hence, likewise, is low in HCl trapping capacity.

The exhaust gas treatment agents according to Comparative Examples 6 and 7 are small in mean particle diameter and large in specific surface area, hence are excellent in HCl trapping capacity and neutralizing capacity. However, as mentioned later (see Table 3 and Table 5), the content of calcium hydroxide particles is high, so that they are inferior in heavy metal fixing ability and strength upon solidification.

The exhaust gas treatment agent according to Comparative Example 8 is low in calcium hydroxide particle content, hence low in HCl trapping capacity.

The exhaust gas treatment agent according to Comparative Example 9 is markedly high in calcium hydroxide particle content, hence superior in HCl trapping capacity. However, as mentioned later (cf. Table 3 and Table 5), it is inferior in heavy metal fixing ability and strength upon solidification since its calcium hydroxide particle content is high.

Test Example 2

Neutral fly ash (100 g) collected from a waste incineration plant and 40 g of cement were admixed in advance with 270 g of each of the exhaust gas treatment agent 1 and exhaust gas treatment agent 2 according to the invention and the exhaust gas treatment agents according to Comparative Examples 1 to 9. Water (210 g) was added to each mixture and the resulting mixture was kneaded and molded to give a test specimen (diameter 50 mm×length 100 mm) and the test specimen after 28 days was measured for strength. Separately, the test specimen after 7 days was subjected to Pb leaching testing according to the Environment Agency (Japan) Notification No. 13. The results are shown in Table 3.

TABLE 3

|  | Pb leaching (mg/l) | Strength (kgf/cm²) |
|---|---|---|
| Example 1 | 0.25 | 11.5 |
| Example 2 | 0.27 | 10.3 |
| Compar. Ex. 1 | 2.50 | 9.0 |
| Compar. Ex. 2 | 2.70 | 8.5 |
| Compar. Ex. 3 | 0.50 | 8.3 |
| Compar. Ex. 4 | 1.20 | 11.5 |
| Compar. Ex. 5 | 1.00 | 11.5 |
| Compar. Ex. 6 | 2.50 | 4.3 |
| Compar. Ex. 7 | 0.53 | 7.7 |
| Compar. Ex. 8 | 0.25 | 10.5 |
| Compar. Ex. 9 | 3.10 | 2.2 |

The leaching out of Pb from the test specimens with the exhaust gas treatment agent-1 and exhaust gas treatment agent-2 according to the invention incorporated therein was not more than one tenth of that found with the known treatment agent slaked lime. The leaching levels are below the leaching limit (0.3 ppm).

The test specimens with the exhaust gas treatment agent 1 and exhaust gas treatment agent 2 according to the invention incorporated therein are superior in strength, too.

Test Example 3

In an actual incinerator, the exhaust gas treatment agent 1 according to the invention and the exhaust gas treatment agent according to Comparative Example 9 were each respectively blown into the flue and 100 g of the soot and dust recovered was kneaded with 30 g of water and the resultant matter was subjected to Pb leaching testing as prescribed in the Environment Agency (Japan) Notification No. 13. The results are shown in Table 4.

The incinerator used was a stoker fired furnace incinerating 20 tons per day, the exhaust gas treatment system employed was the dry electrostatic precipitator system, and the dose of the gas treatment agent blown into the flue was 10.2 kg/hr.

TABLE 4

|  | Pb leaching (mg/l) |
|---|---|
| Example 1 | 0.22 |
| Compar. Ex. 9 | 3.10 |

As is evident from the results shown in Table 4, in the actual incinerator, too, the leaching of Pb from the solidified soot and dust obtained by blowing the exhaust gas treatment agent according to the invention into the flue and recovering the same was at a level reduced to less than one tenth as compared with the case in which the exhaust gas treatment agent according to Comparative Example 9 was used.

Discussion About the Results of Test Example 1 to 3 -(1)

By summing up the results shown above in Tables 2 and 3 and evaluating them in terms of neutralizing capacity, heavy metal fixing capacity and strength upon solidification, the evaluation results shown in Table 5 are obtained.

TABLE 5

|  | Neutralizing capacity | Heavy metal fixing capacity | Strength upon solidification |
|---|---|---|---|
| Example 1 | ○ | ○ | ○ |
| Example 2 | ○ | ○ | ○ |
| Compar. Ex. 1 | x | x | Δ |
| Compar. Ex. 2 | x | x | Δ |
| Compar. Ex. 3 | x | Δ | Δ |
| Compar. Ex. 4 | x | x | ○ |
| Compar. Ex. 5 | Δ | Δ | ○ |
| Compar. Ex. 6 | ○ | x | x |
| Compar. Ex. 7 | ○ | Δ | Δ |
| Compar. Ex. 8 | x | ○ | ○ |
| Compar. Ex. 9 | ○ | x | x |

The evaluation criteria for the respective performance characteristics shown in Table 5 are as follows.

(1) Neutralizing capacity
  ○ ... above $10^{-4}$ mol/g
  Δ ... $5 \times 10^{-5}$ to $10^{-4}$ mol/g
  x ... below $5 \times 10^{-5}$ mol/g (2) Heavy metal fixing capacity
  ○ ... below 0.3 mg/l (below the Pb leaching limit value)
  Δ ... 0.3 to 1.0 mg/l
  x ... above 1.0 mg/l (3) Strength upon solidification
  ○ ... above 10 kgf/cm²
  Δ ... 5 to 10 kgf/cm²
  x ... below 5 kgf/cm²

As is evident also from the results shown in Table 5, the exhaust gas treatment agents according to the invention have all the desired neutralizing capacity, heavy metal fixing capacity and solidification strength.

Discussion About the Results of Test Example 1 to 3—(2)

The exhaust gas treatment agents according to Examples 1 and 2 and Comparative Examples 6, 7 and 8 satisfy the requirements established by the present invention with respect to mean particle diameter and specific surface area. Therefore, for these exhaust gas treatment agents, the relation between the content of calcium hydroxide particles and the HCl fixing capacity or the Pb fixing capacity (expressed in terms of the level of leaching of Pb from the solidification product) is graphically shown in FIG. 1 or FIG. 2, respectively.

Figure 2:
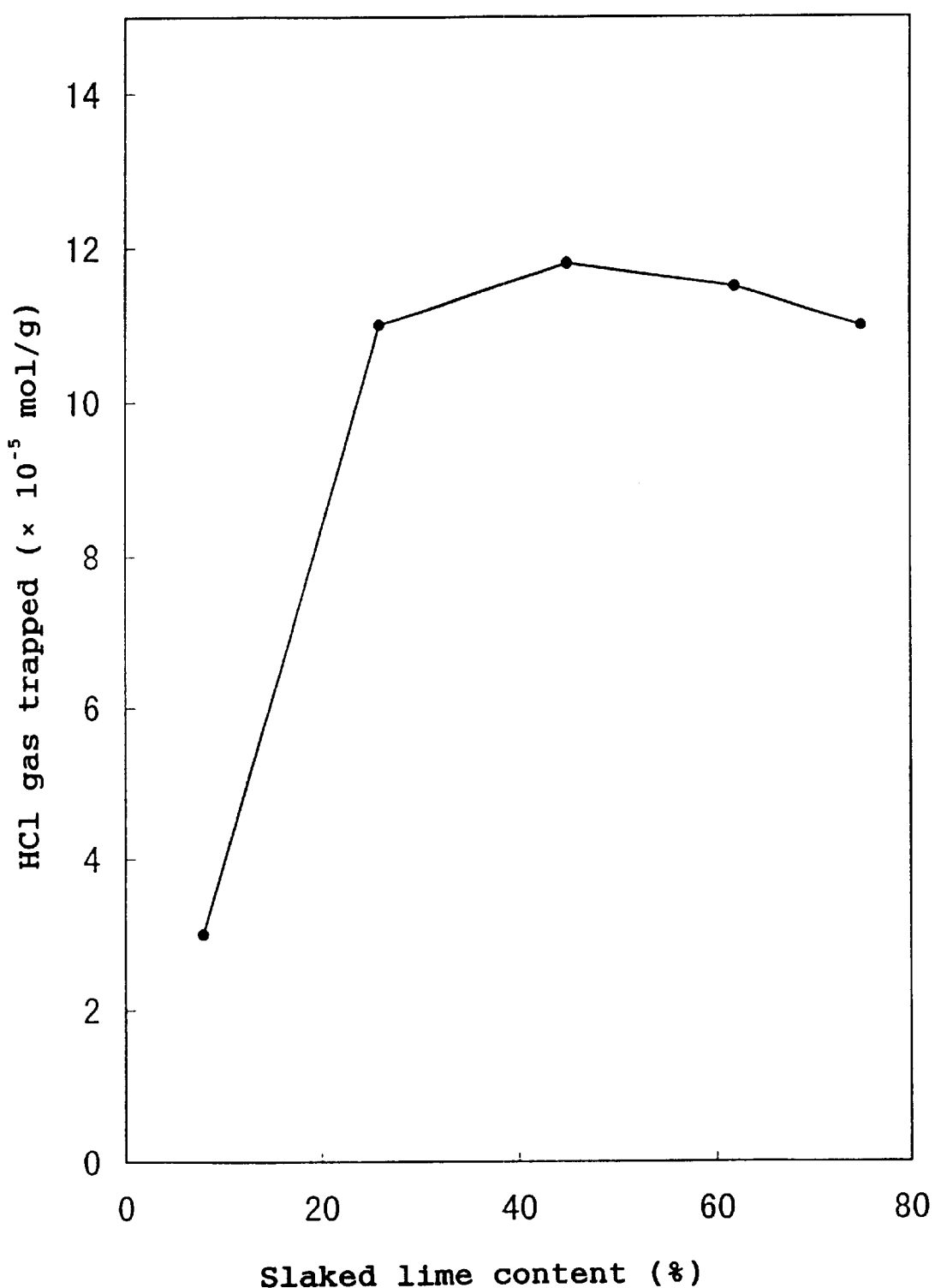
FIG. 2 is a graphic representation of the relation between the content of calcium hydroxide particles and the ability to fix Pb (expressed in terms of the amount of Pb leached out from the solidified mass) for the exhaust gas treatment agents prepared in the examples and comparative examples.

The results shown in FIG. 1 and FIG. 2 indicate that it is essential for the calcium hydroxide particle content in an exhaust gas treatment agent to be within the range of 20 to 60% by weight so that high levels of HCl trapping capacity and Pb fixing capacity can be attained.

What is claimed is:

1. An exhaust gas treatment agent characterized in that it comprises calcium silicate hydrate particles having a mean particle diameter of 0.2 to 4 μm and a specific surface area of more than 60 m²/g and calcium hydroxide particles having a mean particle diameter of not more than 4 μm and the content of calcium hydroxide particles in both particle components is within the range of 20 to 60% by weight, wherein HCl trapping capacity of the agent is higher than that of special grade slaked lime and a Pb leaching value of the agent is not more than one tenth of that of special grade slaked lime.

2. An exhaust gas treatment agent as claimed in claim 1 being in slurry form.

3. A method of producing slurry-form calcium silicate- and calcium hydroxide-based exhaust gas treatment agents of claim 2 which comprises adding 100 to 2,000 parts by weight of water to a total of 100 parts by weight of a calcium silicate-containing raw material plus a calcium hydroxide-generating raw material and carrying out the hydration reactions at 40 to 100° C. while wet-grinding said materials to form said calcium silicate hydrate particles and said calcium hydroxide particles.

4. An exhaust gas treatment agent as claimed in claim 1 being in dry powder form.

5. A method of producing powder-form calcium silicate- and calcium hydroxide-based exhaust gas treatment agents of claim 4 which comprises adding 100 to 2,000 parts by weight of water to a total of 100 parts by weight of a calcium silicate-containing raw material plus a calcium hydroxide-generating raw material and carrying out the hydration reactions at 40 to 100° C. while wet-grinding said materials and then drying and classifying the reaction product to form said calcium silicate hydrate particles and said calcium hydroxide particles.

6. A process for exhaust gas treatment which comprises contacting an exhaust gas with the exhaust gas treatment agent defined in claim 1.

7. A process for the treatment of exhaust gases and soot and dust which comprises contacting an exhaust gas with the exhaust gas treatment agent defined in claim 1 and adding water to the soot and dust collected from the exhaust gas in a dust collector and kneading and solidifying the resulting mixture.

* * * * *